(12) United States Patent
Tu et al.

(10) Patent No.: US 6,552,975 B1
(45) Date of Patent: Apr. 22, 2003

(54) METHODS FOR ESTABLISHING RECORDING RATES OF OPTICAL MEDIA RECORDERS

(75) Inventors: Yaoyuan Tu, Cupertino, CA (US); Yau-Ting Mau, Fremont, CA (US); Gianluca Macciocca, San Francisco, CA (US)

(73) Assignee: Roxio, Inc., Santa Clara, CA (US)

( * ) Notice: Subject to any disclaimer, the term of this patent is extended or adjusted under 35 U.S.C. 154(b) by 307 days.

(21) Appl. No.: 09/686,213

(22) Filed: Oct. 10, 2000

(51) Int. Cl.[7] .................................................. G11B 7/00
(52) U.S. Cl. .................. 369/47.1; 369/47.28; 369/59.1; 369/59.27
(58) Field of Search .............................. 369/47.1, 47.2, 369/47.28, 47.29, 47.36, 47.46, 47.48, 53.1, 53.31, 53.34, 53.44, 59.1, 59.23, 59.27, 60.01

(56) References Cited

U.S. PATENT DOCUMENTS 6,347,184 B2 * 2/2002 Yamagishi ................... 386/95
6,424,607 B2 * 7/2002 Fujinami et al. ......... 369/47.28

* cited by examiner

*Primary Examiner*—Muhammad Edun
(74) *Attorney, Agent, or Firm*—Martine & Penilla, LLP

(57) ABSTRACT

Methods for the recording of data to an optical media are provided. In one example, a method includes the determining of the length of a single audio file. A test burn is then performed in which all of the operations required to record the single audio file to optical media are performed except the actual transfer of data to the optical media. During the test burn, the amount of time required to decode the single audio file is measured, and then a codec decoding factor is calculated. The codec decoding factor is equal to the length of the single audio file divided by the amount of time required to decode the single audio file. The codec decoding factor is used to set the recording speed of a selected optical recording device to avoid buffer under-run.

26 Claims, 4 Drawing Sheets

METHODS FOR ESTABLISHING RECORDING RATES OF OPTICAL MEDIA RECORDERS

BACKGROUND OF THE INVENTION

1. Field of the Invention

The present invention relates generally to the recording of data onto optical media, and more particularly to a method for determining actual system audio decoding speed in preparation for commencing a recording operation to prevent buffer under-runs.

2. Description of the Related Art

When recording audio data to optical media, the source audio data is typically in a compressed form that must be decompressed or decoded during the recording process. The proliferation of consumer use of the Internet has opened access to a vast resource of audio data that can be enjoyed from a source on the web, and can be downloaded to allow consumer creation of custom CD's for home, office, and car stereo use, as well as the ability to assemble large personal libraries of one's favorite audio recordings. In order for audio files, typically very large files, to be successfully transmitted, the files are compressed or encoded for data transmission, and then decompressed or decoded by a consumer's computer for playback or to record or burn to optical media.

When recording is desired, selected audio data is typically retrieved by a CD recording engine of a host computer system. The recording engine reads data from a source which can be, for example, a source on the Internet, the host system hard disk drive, a local network, or another CD drive. The audio data is then decoded, transferred to a faster access buffer memory, and then continuously recorded onto one or more tracks of an optical disc during a recording session. However, as recording rates for optical discs have increased beyond 4× (1× being defined as normal music playback speed), the rate of recording onto the optical disc frequently exceeds the rate at which the recording engine can replenish data in the buffer memory. Although increasing processor speeds and other system improvements and enhancements increase the rate of data transfer to buffer memory, system resource availability and consumption decrease the rate of data transfer in a time-share environment. By way of example, the process of decoding audio data consumes system resources, as does the incidence of other applications running at the same time as the audio recording software application. The rate of data transfer from the source to the audio decoder can also impact the rate of data transfer from the audio decoder to the buffer memory. Therefore, the capability of the recording device to burn audio to optical media often exceeds the capability of the recording engine to transfer audio data to buffer memory.

A buffer under-run occurs when the buffer memory is unable to continuously provide data for an uninterrupted recording of the files to a given track of the optical disc. Eventually, after the buffer under-run occurs, the burning stops. With the technological advancements being realized in CD recording devices, the recording speed continues to increase. This leads to increased likelihood of buffer under-run during the recording of audio data due to the large file size and the requirement that audio must be decoded during the recording process. Data files, conversely, containing text and some images are generally small enough that they don't require compression and decompression.

The consequences of one or more buffer under-runs during recording to an optical disc depend on the type of optical disc used during the recording. A CD-R optical disc can only undergo one recording, and the inaccessible remaining files typically cause the CD-R optical disc to be scrapped and replaced by a fresh CD-R optical disc for a repeated recording. A CD-RW optical disc can be written to multiple times, since the optical disc can be erased and the recording can be repeated. However, the repeating of recording sessions can take considerable time, especially if the recording is of a large track. Furthermore, regardless of whether the optical disc is CD-R or CD-RW, another buffer under-run can occur during the repeated recording session, causing the loss of the time spent on the recording session, if not the entire optical disc (in the case of CD-R optical discs).

The CD recording engine can be programmed to compensate for the slower data transfer to buffer memory by slowing the recording speed of the recording device so that the recording device is not depleting the buffer faster than the recording engine can replenish it. There is, however, no method in the prior art to accurately determine the optimum recording speed to match the rate of depletion of data from the buffer with the rate of replenishment. Any modification of the recording speed is nothing more than an operator guess that can eventually result in finding a speed at which discs are not ruined or time lost, but will never optimize the recording speed as described above.

FIG. 1 illustrates a block diagram 100 of a typical audio recording operation. A CD recording application 110, for example Easy CD Creator from Adaptec, Inc. of Milpitas, Calif., initiates a recording process. The CD recording engine 130 performs the tasks necessary to send selected audio data through CD recording circuitry to a selected CD recording device 150. As described above, the audio data is read from a source, e.g., a source disk, and decoded or decompressed by an audio decoder 120. The decoded audio to be recorded is then sent to a buffer for the CD recording device 150 and then read from the buffer and burned to a destination audio CD. As described above, the speed at which the CD recording engine 130 can send audio data to the buffer for the CD recording device 150 cannot be faster than the rate of data decoding in the audio decoder 120. The process of decoding data itself slows the data transfer rate by consuming system resources, and the rate of data transfer to the buffer can also be slowed by other system resource demands. In FIG. 1, the audio recording configuration 100 is shown with such factors as available CPU resources 140a, available memory resources 140b, and the performance capabilities of the source disk 140c, all impacting the performance of the CD recording engine 130. When combined with the audio decompression in the audio decoder 120, these factors can significantly impact the rate of audio data transfer to the buffer for the CD recording device 150. Further, this impact changes with changes in, for example, system configuration, source of audio data, and the kinds and numbers of other applications running on the host computer system.

In view of the foregoing, there is a need for a method for the recording of audio data to optical media that optimizes the recording speed of the recording device to accommodate for audio decoding, system configuration, and other system demands. The method should provide a recording system with a system-specific determination of data transfer that can be changed with changes in system configuration and/or resource demands, and allow the CD recording engine to modify the recording speed as necessary. This method should be configured to avoid the problems of the prior art.

SUMMARY OF THE INVENTION

Broadly speaking, the present invention fills these needs by providing a method for recording audio files to optical media that optimizes the recording speed of a CD recording device in accordance with the rate at which the CD recording engine can supply data to a buffer for the CD recording device. The present invention can be implemented in numerous ways, including as a process, an apparatus, a system, a device, a method, or a computer readable media. Several embodiments of the present invention are described below.

In one embodiment, a method for the recording of data to optical media is disclosed. The method includes the determination of a length of a single audio file, the measuring of an amount of time required to decode the single audio file, and the calculation of a codec decoding factor. The codec decoding factor is equal to the length of the single audio file divided by the amount of time required to decode the single audio file. Using the codec decoding factor, a recording speed is set for a CD recording device.

In another embodiment, a method for recording data to optical media is disclosed. The method includes the determining of a length of a single audio file. The method then provides for a test burn of the single audio file without recording data to the optical media. During the test burn, an amount of time required to decode the single audio file is measured. Once the file is decoded, a codec decoding factor is calculated which is equal to the length of the single audio file divided by the time required to decode the single audio file during the test burn.

In still a further embodiment, a method for recording data to optical media is disclosed. The method begins with the determination of a length of a single audio file. The method then calls for the determination of a system configuration factor of a host computer system. The method then calculates a codec decoding factor equal to the length of the single audio file divided by the time required to decode the single audio file. An optimized codec decoding factor is produced by multiplying the system configuration factor by the codec decoding factor.

The advantages of the present invention are numerous. One notable benefit and advantage of the invention is that buffer under-run can be minimized or avoided in the recording of audio to CD or other optical media. As described above, the increasing speed capabilities of recording devices does not take into account the rate at which the CD recording engine can supply data to a buffer for the CD recording device. The present invention provides a plurality of methods by which the CD recording engine can determine a rate at which data can be supplied to a buffer of a CD recording device, and then use that rate to set the recording speed for the selected recording device. By matching the recording speed of the optical media recording device to the rate at which data can be supplied to the buffer for the CD recording device, buffer under-run is avoided.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

Methods for recording audio files to optical media are disclosed. In preferred embodiments, the methods optimize the recording speed of a CD recording device in accordance with the rate at which a CD recording engine can supply data to a buffer for the CD recording device. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
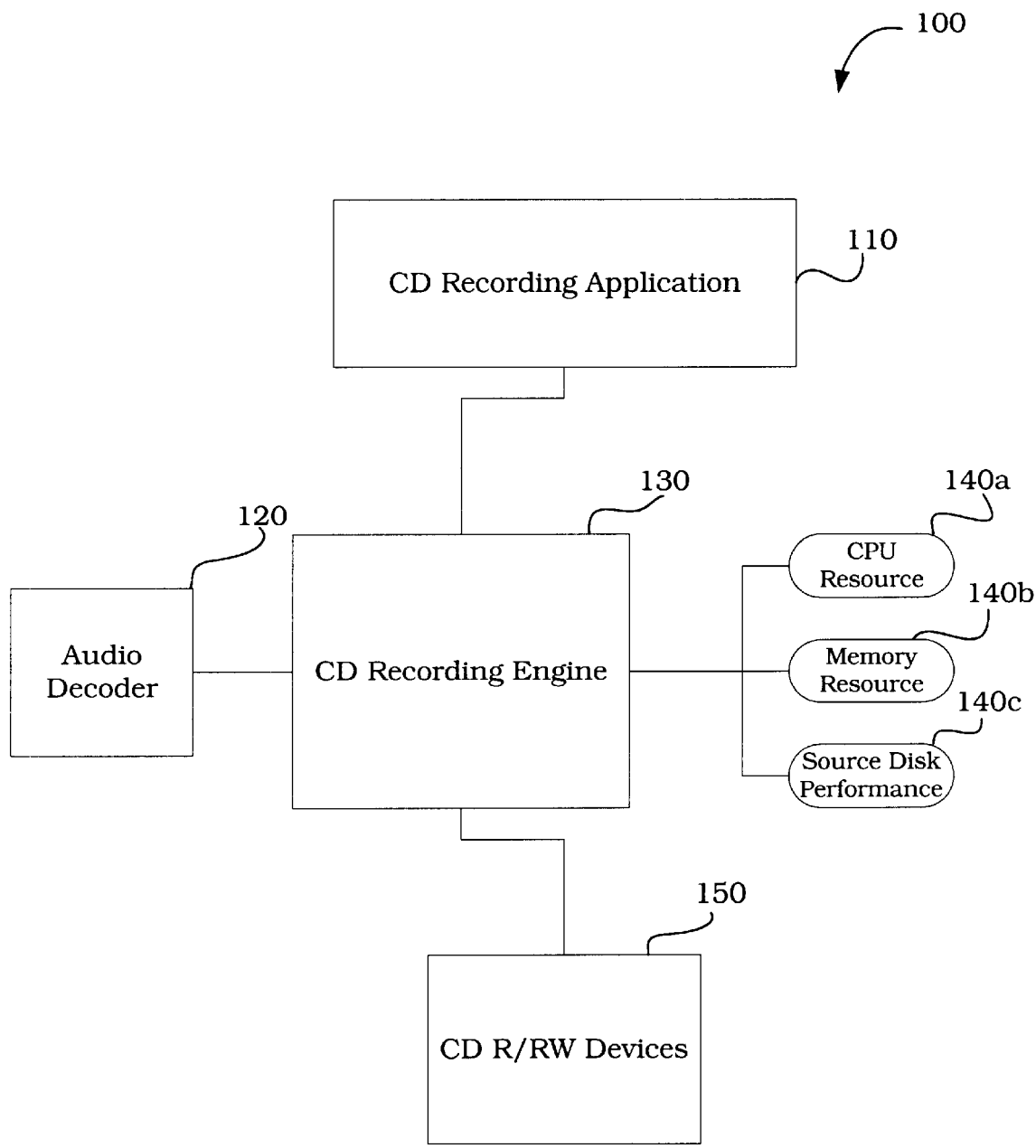
FIG. 1 illustrates a block diagram of a typical audio recording system configuration.
Figure 2:
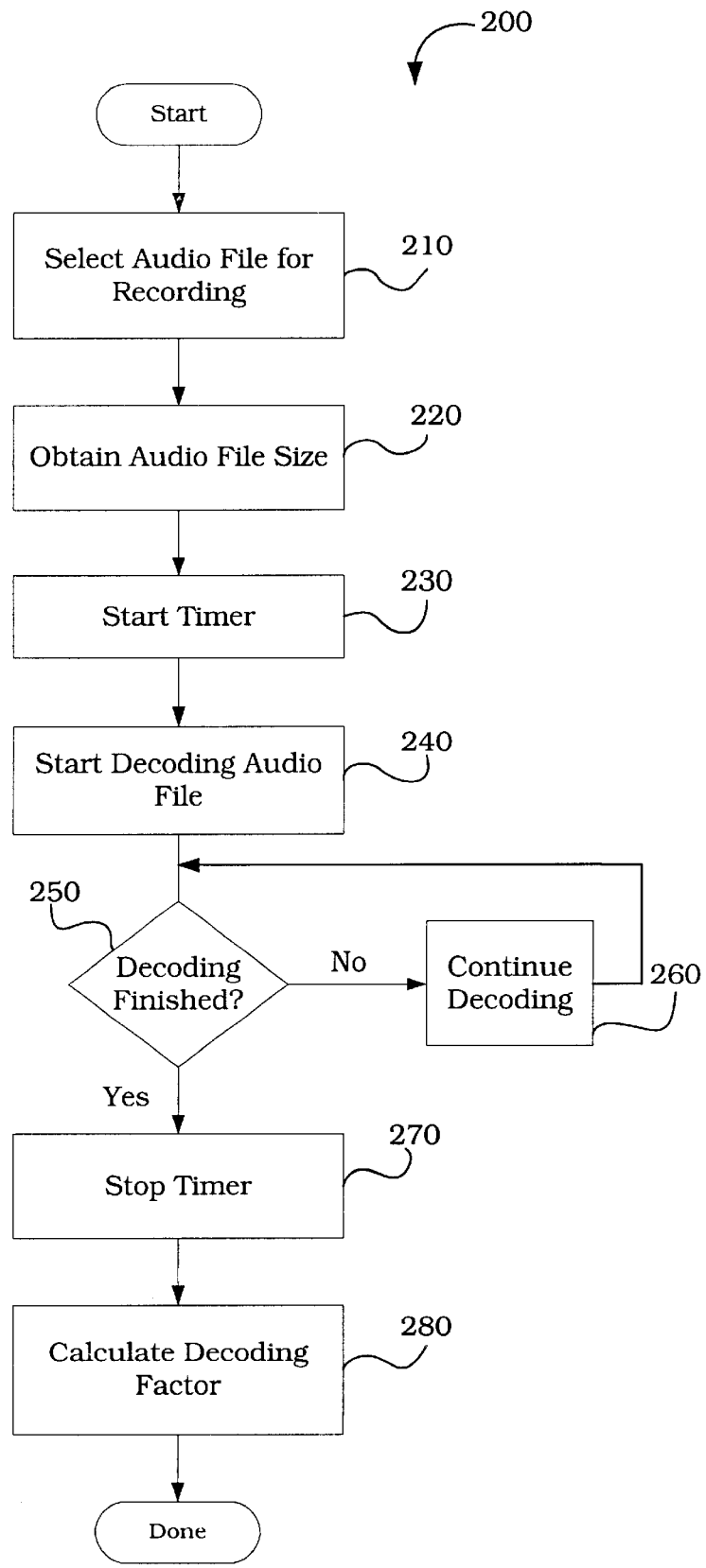
FIG. 2 shows a flowchart diagram illustrating the method operations performed in which a benchmark codec decoding factor is determined in accordance with one embodiment of the invention.

FIG. 2 shows a flowchart diagram 200 illustrating the method operations performed in which a benchmark codec decoding factor is determined in accordance with one embodiment of the invention. As is known, a codec is a software module or operation used by the CD recording engine to decompress or decode audio files for audio recording. As used herein, a codec decoding factor is derived by measuring the decoding of audio files by a particular codec configured to a particular CD recording engine.

The method begins with operation 210 in which an audio data file is selected for recording. The audio source, by way of example, can be an Internet site with a database of audio files, an audio file that has been downloaded or written to the host computer system hard drive, an audio file on a music CD on a CD-R/RW device connected to the host computer, an audio file on a hard disk or peripheral device of a computer networked with the host system, or any such location capable of storing an audio file.

The method next obtains the file size of the selected audio file in operation 220. A data structure of the format in which the source file is written provides a length of the selected file in bytes. By way of example, an audio file can be in Redbook format (Compact Disc Digital Audio System Description Specification, November 1991, and both earlier and later versions), MP3 (MPEG1 Audio Layer 3, ISO/IEC 11172-3 1993, Information Technology—Coding of moving pictures and associated audio to digital storage media at up to about 1.5 Mbits/sec.—Part 3: Audio), WMF (Microsoft Windows Media Format), and the like. A data structure may be a file system, or component thereof, identifying a source location and length of the selected audio file. It should be understood that other audio formats that follow other standards will also work with the present invention. The recording engine obtains the length or size of the selected audio file for a later calculation. It should be noted that the file size obtained is for a single audio file or song, and not for any combined length of the total number of audio files that may be designated to be recorded to the same destination optical disc.

In operation 230, the method starts a timer, and in operation 240 the method begins decoding the file from operation 210. The method determines the length of time to decode a single audio file in order to calculate a decoding benchmark. Thus, the starting of the timer in operation 230 is followed immediately by the starting of the decoding of the file in operation 240.

In order to accurately determine the time required to decode the file, the method closely monitors the status of the decoding. A monitor loop is established in decision block 250 in which the method determines whether the decoding is complete. If the decoding is not finished, a "no" to decision block 250, the method continues decoding in operation 260 and continues the monitor loop. When the decoding is finished, a "yes" in decision block 250, the method advances to operation 270 and stops the timer.

The method then performs operation 280 and calculates a codec decoding factor. The decoding factor is calculated by dividing the length of the audio file obtained in operation 220 by the time required to decode the file. The decoding factor thus calculated provides a benchmark decoding speed for the audio decoder, and the method is done.

The benchmark decoding speed calculated in the method operations illustrated in FIG. 2 is used by the recording engine, in one embodiment, to optimize the recording speed of a selected optical recording device. The recording engine adjusts the recording speed according to the actual rate in which the audio decoder decodes audio data from the selected source, as well as the effect of the process of decoding on the rate in which the recording engine can transfer the decoded audio data to buffer memory. The calculated decoding factor enables the CD recording engine to accurately predict the rate at which data can be supplied to the buffer, and then optimize the recording speed of the recording device to minimize the likelihood of buffer under-run.

Figure 3:
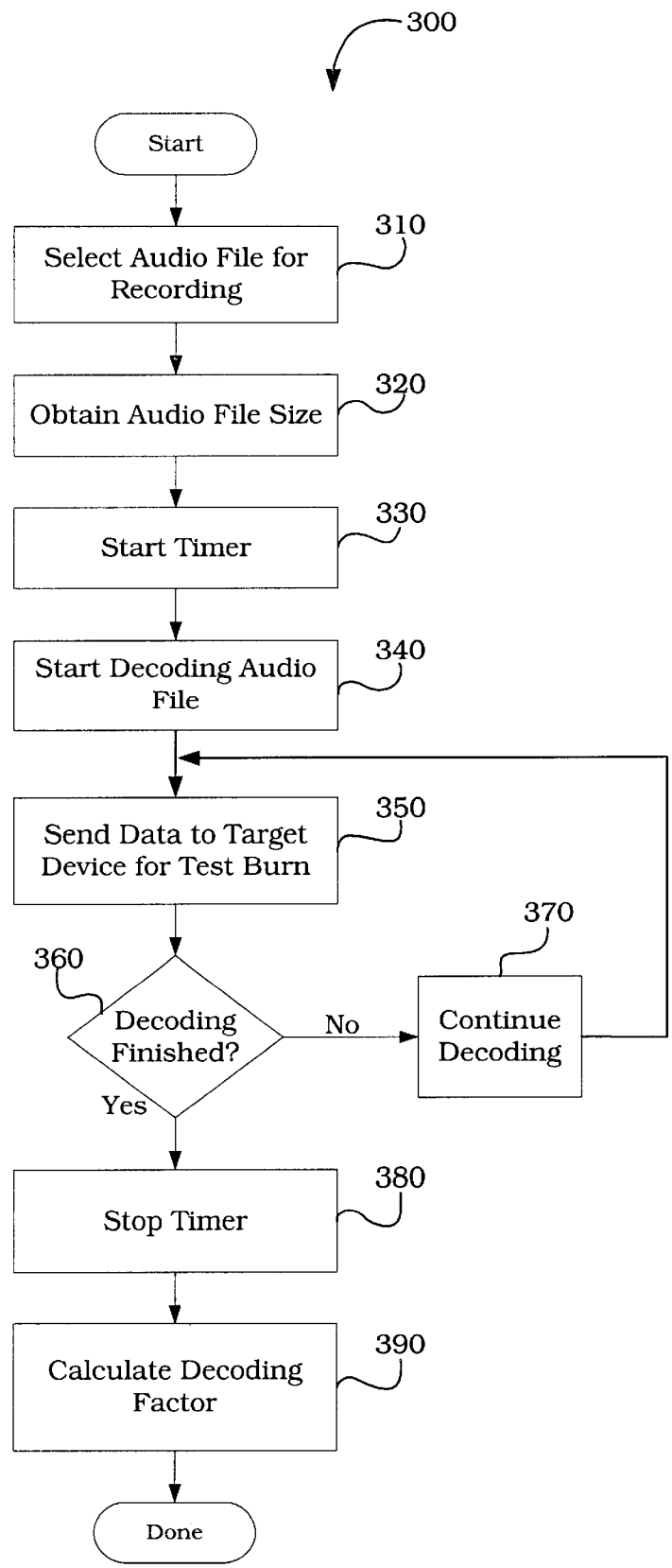
FIG. 3 shows a flowchart diagram illustrating the method operations performed in which a benchmark codec decoding factor is determined in accordance with another embodiment of the invention.

FIG. 3 shows a flowchart diagram 300 illustrating the method operations performed in which a benchmark codec decoding factor is determined in accordance with another embodiment of the invention. The method illustrated in FIG. 3 is similar to that illustrated in FIG. 2. The operations of selecting an audio file for recording 310, obtaining the audio file size 320, starting the timer 330 and starting the decoding of the audio file 340, are the same as those operations illustrated and discussed in reference to FIG. 2.

Following operation 340 in which the method starts decoding the selected audio file, the method advances to operation 350 and sends the decoded audio data to the target CD-R/RW recording device for a test burn. Many CD-R/RW devices allow for a test burn in which all of the operations that would be accomplished during the actual recording of an audio file, track or disc are executed except for the actual burn. As is known, the recording, or burn, of data to a CD is performed by a laser transferring the data to the recording surface of the CD. A simulation, or test burn, is the transfer of the selected data to the device buffer, the reading of the data out of the buffer and through the recording circuitry, the positioning of the laser head, and the positioning and spinning of the target disc as if data were being burned to the disc. The laser, however, remains secured and no data is actually transferred. As discussed above, the target recording device consumes system resources when operating, and in so doing, impacts the recording engine and the speed at which it processes and sends data to the device buffer. In one embodiment, the impact on the recording engine is minimal, but even minimal impact can result in an incorrect calculation of the decoding factor. In order to optimize the speed of audio data recording and avoid the prior art problems, the most accurate measure of system performance must be accomplished.

Once the method begins sending decoded data to the target recording device for a test burn in operation 350, the method enters the monitor loop as discussed above in reference to FIG. 2. Decision block 360 represents the method of determining whether the decoding is complete. So long as the answer to decision block 360 is "no," the method continues decoding, as represented by operation 370, and loops to a point just prior to operation 350 so that the decoded data continues to be sent to the target device for a test burn. Once the response to decision block 360 is "yes," the method advances to operation 380 to stop the timer.

The method concludes with operation 390. As discussed above in reference to FIG. 2, the method calculates a codec decoding factor in operation 390 which is equal to the length of the file obtained in operation 320, divided by the time required to decode the audio file. The decoding factor is then used to set a benchmark decoding speed for the audio decoder, and the method is done.

The embodiment illustrated to calculate the benchmark decoding speed in FIG. 3 is used by the recording engine to optimize the recording speed of the selected optical recording device. This embodiment represents an accurate determination of the decoding speed of a specific system writing to a specific target device. The recording engine adjusts the recording speed according to the actual rate in which the audio decoder decodes audio data from the selected source, and under the constraints and with the system resources of the specific system. The calculated decoding factor enables the CD recording engine to accurately predict the rate in which data can be supplied to the buffer, and then optimize the recording speed of the recording device to minimize the likelihood of buffer under-run.

Figure 4:
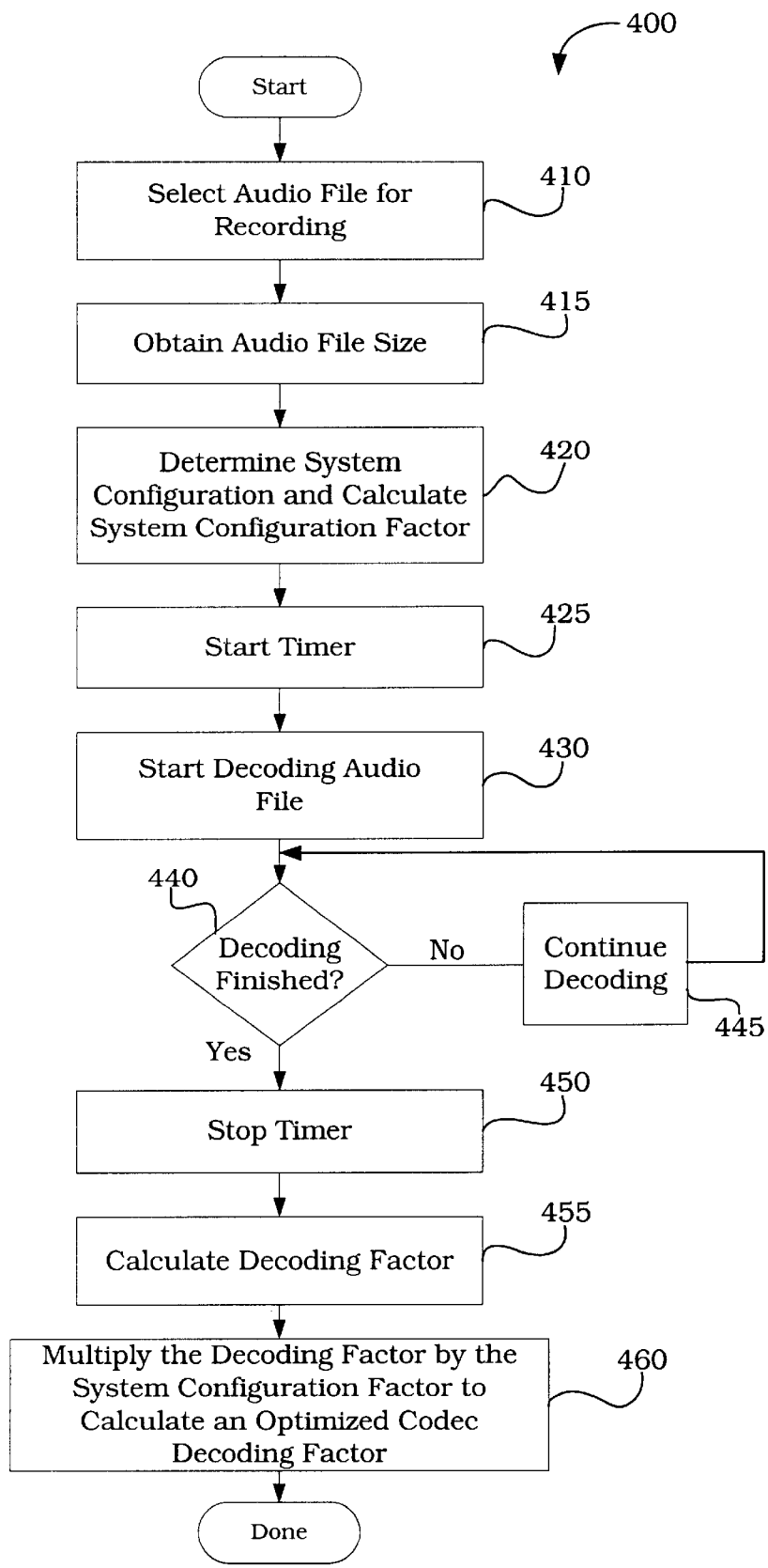
FIG. 4 shows a flowchart diagram illustrating the method operations performed in which a programmed codec decoding factor is determined in accordance with yet another embodiment of the invention.

FIG. 4 shows a flowchart diagram 400 illustrating the method operations performed in which a programmed codec decoding factor is determined in accordance with yet another embodiment of the invention. The method illustrated in FIG. 4 is similar to that illustrated in FIGS. 2 and 3. The operations of selecting an audio file for recording 410, and obtaining the audio file size 415, are the same as those operations illustrated and discussed in reference to FIGS. 2 and 3.

Once the audio file size has been determined in operation 415, the method advances to operation 420 in which a system configuration factor is calculated based on a specific system configuration. In one embodiment, a CD recording software program would prompt a user to select devices from a list, menu, or the like to construct the particular configuration in use. In such an embodiment, the CD recording software program might execute a routine in which the user is prompted to update the system configuration upon initiation of a record operation. In another embodiment, the CD recording engine is integrated with the host operating system, and the CD recording engine is updated without user intervention as to the system configuration and status when a record operation is initiated.

The system configuration, however it may be determined, is used to calculate a system configuration factor. In one embodiment, the CD recording engine is programmed to assign a pre-set value or factor to each peripheral device, system resource, user application, and the like. In one embodiment, a CD recording software program might contain tables of values associated with specific makes and models of various peripheral devices, tables of values associated with specific processors, memory configurations, applications, and the like. When determining the system configuration factor, the various specific values corresponding to the specific configuration of the host computer system as input by a user or determined by the software program and system itself, are combined, and the result is the system configuration factor. The system configuration factor is calculated to determine specific system resource availability based on the resource requirements of devices and applications actually configured to the system.

Next, the method advances to operation 425 in which the timer is started, and then to operation 430 in which the audio file is decoded. As discussed in reference to FIG. 2 above, the method maintains an accurate monitor of the decoding process by establishing a monitor loop as represented by decision block 440. So long as the audio file is being decoded, a "no" to decision block 440, the method continues decoding, operation 445, and maintains the monitor loop. When the decoding is finished, a "yes" to decision block 440, the method advances to operation 450 and stops the timer.

As discussed above in reference to FIGS. 2 and 3, the method next calculates a codec decoding factor in operation 455. The decoding factor is equal to the length of the file divided by the time required to decode. The method advances to operation 460 where it concludes with the calculation of an optimized codec decoding factor. The optimized codec decoding factor is the result of multiplying the codec decoding factor calculated in operation 455 by the system configuration factor derived in operation 420. The result represents an accurate measurement of the speed of the codec, and factors the actual demand on system resources based on system configuration that will impact recording engine performance during a simulated or actual recording session.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for recording data to optical media, comprising:
    determining a length of a single audio file;
    measuring an amount of time required to decode the single audio file;
    calculating a codec decoding factor, the codec decoding factor being equal to the length of the single audio file divided by the amount of time required to decode the single audio file; and
    determining a recording speed to be used to record data to a CD recording device.

2. A method for recording data to optical media as recited in claim 1, wherein the recording speed is configured to ensure a rate of data recorded to optical media does not exceed a rate of data sent to a buffer of the CD recording device.

3. A method for recording data to optical media as recited in claim 1, wherein the determining of the length of the audio file includes,
    examining a data structure associated with the single audio file.

4. A method for recording data to optical media as recited in claim 1, wherein the measuring of the amount of time required to decode the single audio file includes,
    starting a timer;
    commencing a decoding of the single audio file; and
    stopping the timer.

5. A method for recording data to optical media as recited in claim 1, further comprising:
    supplying the recording speed to a CD recording engine; and
    initiating a recording of one or more audio files to the optical media resident in the CD recording device.

6. A method for recording data to optical media as recited in claim 1, wherein the CD recording device is one of a CD-R and a CD-RW.

7. A method for recording data to optical media, comprising:
    determining a length of a single audio file;
    performing a test burn without recording data of the single audio file to the optical media;
    measuring an amount of time required to decode the single audio file during the test burn; and
    calculating a codec decoding factor, the codec decoding factor being equal to the length of the single audio file divided by the amount of time required to decode the single audio file.

8. A method for recording data to optical media as recited in claim 7, further comprising:
    determining a recording speed to be used to record data to a CD recording device, the determining being configured to use the codec decoding factor.

9. A method for recording data to optical media as recited in claim 8, wherein the recording speed is configured to ensure a rate of data recorded to optical media does not exceed a rate of data sent to a buffer of the CD recording device.

10. A method for recording data to optical media as recited in claim 8, further comprising:

supplying the recording speed to a CD recording engine; and initiating a recording of one or more audio files to the optical media resident in the CD recording device.

11. A method for recording data to optical media as recited in claim 8, wherein the CD recording device is one of a CD-R and a CD-RW.

12. A method for recording data to optical media as recited in claim 7, wherein the test burn includes, positioning the optical media within the CD recording device;

sending data to be recorded through CD recording circuitry; and performing all operations of a burn except transferring data to the optical media.

13. A method for recording data to optical media as recited in claim 7, wherein the determining of the length of the audio file includes, examining a data structure associated with the single audio file.

14. A method for recording data to optical media as recited in claim 7, wherein the measuring of the amount of time required to decode the single audio file includes, starting a timer;

commencing a decoding of the single audio file; and stopping the timer.

15. A method for recording data to optical media, comprising:

determining a length of a single audio file;

determining a system configuration factor of a host computer system;

measuring an amount of time required to decode the single audio file;

calculating a codec decoding factor, the codec decoding factor being equal to the length of the single audio file divided by the amount of time required to decode the single audio file; and multiplying the system configuration factor by the codec decoding factor to produce an optimized codec decoding factor.

16. A method for recording data to optical media as recited in claim 15, further comprising:

determining a recording speed to be used to record data to a CD recording device, the determining being configured to use the optimized codec decoding factor.

17. A method for recording data to optical media as recited in claim 16, wherein the recording speed is configured to ensure a rate of data recorded to optical media does not exceed a rate of data sent to a buffer of the CD recording device.

18. A method for recording data to optical media as recited in claim 17, further comprising:

supplying the recording speed to a CD recording engine; and initiating a recording of one or more audio files to the optical media resident in the CD recording device.

19. A method for recording data to optical media as recited in claim 16, wherein the CD recording device is one of a CD-R and a CD-RW.

20. A method for recording data to optical media as recited in claim 15, wherein the determining of the length of the single audio file includes, examining a data structure associated with the single audio file.

21. A method for recording data to optical media as recited in claim 15, wherein the system configuration factor is determined from a pre-programmed table of values assigned to each of a plurality of possible computer devices and configurations, and wherein an operator selects a specific configuration of the host computer system.

22. A method for recording data to optical media as recited in claim 15, wherein the measuring of the amount of time required to decode the single audio file includes, starting a timer;

commencing a decoding of the single audio file; and stopping the timer.

23. Computer readable media having program instructions for recording data to optical media, the computer readable media comprising:

program instructions for determining a length of a single audio file;

program instructions for performing a test burn without recording data of the single audio file to the optical media;

program instructions for measuring an amount of time required to decode the single audio file during the test burn; and program instructions for calculating a codec decoding factor, the codec decoding factor being equal to the length of the single audio file divided by the amount of time required to decode the single audio file.

24. The computer readable media of claim 23, further comprising:

program instructions for determining a recording speed to be used to record data to a CD recording device, the determining being configured to use the codec decoding factor.

25. The computer readable media of claim 24, wherein the recording speed is configured to ensure a rate of data recorded to optical media does not exceed a rate of data sent to a buffer of the CD recording device.

26. The computer readable media of claim 23, wherein performing the test burn further includes, program instructions for positioning the optical media within the CD recording device;

program instructions for sending data to be recorded through CD recording circuitry; and program instructions for performing all operations of a burn except transferring data to the optical media.

* * * * *